United States Patent
Endo

(10) Patent No.: US 12,091,595 B2
(45) Date of Patent: Sep. 17, 2024

(54) CURABLE ORGANOPOLYSILOXANE RELEASE AGENT COMPOSITION FOR THERMAL PAPER, THERMAL PAPER, AND THERMAL RECORDING LABEL SHEET

(71) Applicant: DOW TORAY CO., LTD., Tokyo (JP)

(72) Inventor: Shuji Endo, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 513 days.

(21) Appl. No.: 16/767,973

(22) PCT Filed: Nov. 27, 2018

(86) PCT No.: PCT/JP2018/043500
§ 371 (c)(1),
(2) Date: May 28, 2020

(87) PCT Pub. No.: WO2019/107334
PCT Pub. Date: Jun. 6, 2019

(65) Prior Publication Data
US 2021/0189193 A1 Jun. 24, 2021

(30) Foreign Application Priority Data
Dec. 1, 2017 (JP) ................................ 2017-231351

(51) Int. Cl.
C09J 7/28 (2018.01)
C09J 7/40 (2018.01)

(52) U.S. Cl.
CPC .............. *C09J 7/401* (2018.01); *C09J 7/405* (2018.01); *C09J 2203/334* (2013.01); *C09J 2301/416* (2020.08); *C09J 2400/28* (2013.01); *C09J 2483/005* (2013.01); *Y10T 428/1457* (2015.01)

(58) Field of Classification Search
None
See application file for complete search history.

(56) References Cited

U.S. PATENT DOCUMENTS

| | | | |
|---|---|---|---|
| 5,264,499 A | 11/1993 | Hayashi et al. | |
| 5,292,713 A | 3/1994 | Stenzel et al. | |
| 5,708,075 A * | 1/1998 | Chung | C09D 183/04 428/447 |
| 2005/0075020 A1 | 4/2005 | Benayoun et al. | |
| 2015/0274971 A1 | 10/2015 | Endo et al. | |
| 2015/0284590 A1 | 10/2015 | Endo et al. | |

FOREIGN PATENT DOCUMENTS

| | | | |
|---|---|---|---|
| JP | S61228064 A | 10/1986 | |
| JP | H05171047 A | 7/1993 | |
| JP | H0672024 A | 3/1994 | |
| JP | H10237398 A | 9/1998 | |
| JP | 2008231171 A | 10/2008 | |
| JP | 2011026582 A | 2/2011 | |
| JP | 2013028015 A | 2/2013 | |
| JP | 2013160957 A | 8/2013 | |
| JP | 2015532311 A | 11/2015 | |
| JP | 2015532312 A | 11/2015 | |
| WO | 2003054059 A1 | 7/2003 | |
| WO | WO-2009060964 A1 * | 5/2009 | ............. C08L 83/00 |
| WO | 2011002101 A2 | 1/2011 | |

OTHER PUBLICATIONS

English translation of International Search Report for PCT/JP2018/043500 dated Feb. 26, 2019, 2 pages.
Machine assisted English translation of JPS61228064A obtained from https://worldwide.espacenet.com on May 28, 2020, 9 pages.
Machine assisted English translation of JPH10237398A obtained from https://patents.google.com/patent on May 28, 2020, 10 pages.
Machine assisted English translation of JP2008231171A obtained from https://patents.google.com/patent on May 28, 2020, 11 pages.
Machine assisted English translation of JP2013028015A obtained from https://patents.google.com/patent on May 28, 2020, 10 pages.
Machine assisted English translation of JP2013160957A obtained from https://patents.google.com/patent on May 28, 2020, 9 pages.

* cited by examiner

*Primary Examiner* — Anish P Desai
(74) *Attorney, Agent, or Firm* — WARNER NORCROSS + JUDD LLP

(57) ABSTRACT

Provided is a curable organopolysiloxane releasing agent composition for a thermally sensitive paper wherein a releasing layer that has high adhesion and a good peeling force that is cured quickly at a low temperature without producing curing failures when coated on a thermally sensitive coloring layer, and that is resistant to gellification at room temperature, and that has superior ease of handling, can be formed. The curable organopolysiloxane releasing agent composition comprises: (A) one or more organopolysiloxanes having an alkenyl group with a number of carbon atoms between 4 and 12, where the inclusion proportion of vinyl ($CH_2=CH-$) within the alkenyl group is between 0.5 and 3.0 mass %; (B) an organohydrogen polysiloxane having at least two silicon-bonded hydrogen atoms (Si—H) in a single molecule; (C) a hydrosilylation reaction catalyst; and (D) a hydrosilylation reaction inhibiting agent.

18 Claims, No Drawings

CURABLE ORGANOPOLYSILOXANE RELEASE AGENT COMPOSITION FOR THERMAL PAPER, THERMAL PAPER, AND THERMAL RECORDING LABEL SHEET

CROSS-REFERENCE TO RELATED APPLICATIONS

This application is the National Stage of International Appl. No. PCT/JP2018/043500 filed on 27 Nov. 2018, which claims priority to and all advantages of Japanese Appl. No. 2017-231351 filed on 1 Dec. 2017, the content of which is hereby incorporated by reference.

FIELD OF TECHNOLOGY

The present invention relates to a curable organopolysiloxane releasing agent composition for a thermally sensitive paper wherein a releasing layer that has high adhesion and a good peeling force that is cured quickly at a low temperature without producing curing failures when coated on a thermally sensitive coloring layer, and that is resistant to gellification at room temperature, and that has superior ease of handling, can be formed, and relates to a thermally sensitive paper and a thermally sensitive printing label sheet that uses the same, and to a manufacturing method for the above.

PRIOR ART

Thermally sensitive papers are used in various applications, such as for tickets for trains, and the like, for cash register paper, for thermally sensitive facsimile paper, for paper for meter readings for electricity, gas, and the like, for labels for indicating prices in convenience stores, supermarkets, and the like, and so forth. Such thermally sensitive paper normally is stored rolled into the shape of a roll, and, as necessary, is printed by a printer that has a thermal head for causing thermal color development of a thermally sensitive coloring layer that forms the entire surface, or a portion thereof, of a substrate. Here the thermally sensitive paper that is used in a label, or the like, requires the paper to be fed smoothly and printed smoothly from the roll, and preferably is provided with a top coating layer, over the thermally sensitive coloring layer, to protect the thermally sensitive coloring layer prior to printing, and to cause the thermally sensitive paper, or the like, which is in the form of a roll, to be fed smoothly. This top coat layer must be a thin film in order to preserve printability, and in a linerless label, in particular, it is particularly preferable that it be peelable, and thus it has been proposed that a silicone-based releasing agent that cures quickly at a high temperature through a hydrosilylation reaction, or a silicone-based releasing agent that is ultraviolet radiation curable, be used on thermally sensitive papers, or the like (Patent Document 1, Patent Document 2, etc.).

However, when a conventional hydrosilylation reactive silicone-based releasing agent is used as the top coat layer/releasing layer of a thermally sensitive paper, the thermally sensitive paper as a whole undergoes color development or becomes discolored through the thermally sensitive coloring paper reacting, given the high temperature heating of 100° C. or more is indispensable in the normal hydrosilylation reaction, and thus there is a problem that this makes the printing by the thermal head unclear. In order to avoid this, one may consider using a low temperature, of no more than 90° C., for the hydrosilylation reaction temperature for the silicone-based releasing agent, or reducing the heating time as far as is possible, so as to not cause the thermal reaction of the thermally sensitive coloring layer. However, with low-temperature curing of a silicone-based releasing agent that uses a vinyl group as proposed conventionally, the releasing layer undergoing degradation accompanying curing failure and the reduction in adhesion may lead to falling off. However, if the reaction time is elongated in order to prevent the curing failure, this would cause the cycle time during manufacturing to be longer, which would have a substantial negative effect on the manufacturing efficiency of the thermally sensitive paper, and thus would be unsuitable for industrial manufacturing. The problem is particularly significant when the proportion with which platinum is included is low, as in Patent Document 1.

On the other hand, it is possible to improve the hydrosilylation reactivity of the silicone-based releasing agent on the thermally sensitive coloring layer through increasing the amount of hydrosilylation reaction catalyst that is added. However, typically increasing the amount of the hydrosilylation reaction catalyst, which uses a precious metal, such as platinum, or the like, is uneconomical, and the amount that can be used in industrial production in thermally sensitive paper that is designed and produced so as to be a consumable product is inherently limited. In addition, when the amount of hydrosilylation reaction catalyst that is added in the silicone-based releasing agent composition is increased, then when the coating solution is prepared at room temperature, the time interval over which use is possible (the "pot life") will be shortened remarkably, with rapid gellification, causing a problem in reduced ease of handling. When it is necessary to lengthen the pot life in a normal silicone-based releasing agent, the means to do so are to increase the amount of, or to optimize, the hydrosilylation reaction inhibiting agent in the composition; however, as described above, high temperature heating cannot be applied to a thermally sensitive paper, and an increase in cycle time would be undesirable, and thus it would be difficult to design a silicone-based releasing agent that is suitable for a thermally sensitive paper through adjusting the type or amount of the hydrosilylation reaction inhibiting agent.

Moreover, while the thermally sensitive coloring layer includes a large amount of a compound that includes nitrogen/sulfur as the color developing agent, this causes catalyst poisoning of the hydrosilylation reaction catalyst that uses a precious metal such as platinum, and even if the amount of the hydrosilylation reaction catalyst were simply increased, there is a problem in that this would tend to reduce the adhesion of the releasing layer, a company curing failure. Because of this, varying the type of the thermally sensitive coloring layer or the proportion of inclusion of the color developing agent may produce a problem in terms of suitability for industrial use, unless the curing conditions and the amount of catalyst for the silicone-based releasing agent are optimized.

When, for a thermally sensitive paper, a conventional hydrosilylation reactive silicone-based releasing agent is applied, there will be a plurality of problems that tend to result from mutually incompatible solution strategies, as described above, which may interfere with the acceptance in industrisilicone-based releasing agent in thermally sensitive paper applications. Because of this, there is the strong need for a comprehensive solution, using simple means, for the series of problems that are unique to thermally sensitive paper.

On the other hand, Patent Document 3 and Patent Document 4 disclose a hydrosilylation reactive silicone-based releasing agent that includes an alkenyl group such as a hexenyl group, or the like; however, there is no description nor suggestion whatsoever regarding application thereof to a thermally sensitive paper, nor regarding the benefits of doing so.

PRIOR ART DOCUMENTS

Patent Documents

[Patent Document 1] Japanese Translation of PCT International Application Publication 2005-512796 (International Patent Application Publication 03/054059)
[Patent Document 2] Japanese Unexamined Patent Application Publication H06-072024
[Patent Document 3] Japanese Unexamined Patent Application Publication H05-171047
[Patent Document 4] US Patent Publication 5264499

SUMMARY OF THE INVENTION

Problem Solved by the Present Invention

The present invention is to solve the problem set forth above, and the object thereof is to provide a curable organopolysiloxane releasing agent composition for a thermally sensitive paper that enables formation of a releasing layer that has high adhesion and a good peeling force, substantially without producing curing failures, even when curing for a short time at a low temperature of no greater than 100° C., coated over the thermally sensitive coloring layer of a thermally sensitive paper, and to provide a thermally sensitive paper and a label that uses the same, and a method for manufacturing the same.

Means for Solving the Problem

The result of earnest research was the arrival at the present invention through the discovery that the problems described above can be solved through the use of a curable organopolysiloxane releasing agent composition for a thermally sensitive paper that includes: (A) one or more types of organopolysiloxanes having an alkenyl group with a number of carbon atoms between 4 and 12, where the inclusion proportion of the vinyl ($CH_2=CH-$) within the alkenyl group is between 0.5 and 3.0 mass %; (B) an organohydrogen polysiloxane having at least two silicon-bonded hydrogen atoms (Si—H) in a single molecule; (C) a hydrosilylation reaction catalyst; and (D) a hydrosilylation reaction inhibiting agent, wherein: the silicon atom-bonded hydrogen atoms within the (B) component is in an amount in a range of between 1.0 and 4.0 moles per one mole of carbon-carbon double bonds in the (A) component.

Preferably in the curable organopolysiloxane releasing agent composition for the thermally sensitive paper, described above, two or more types of organohydrogen polysiloxanes having different degrees of polymerization are used in parallel as a cross-linking agent for further improving the adhesion to the thermally sensitive coloring layer. Specifically, the (B) component in the composition described above may be an organohydrogen polysiloxane mixture wherein (B1) an organohydrogen polysiloxane wherein the viscosity at 25° C. is in a range of between 2.5 and 50 mPa·s, and (B2) an organohydrogen polysiloxane wherein the viscosity at 25° C. is in a range of between 100 and 500 mPa·s are mixed with a mass ratio of between 50:50 and 90:10.

In particular, the curable organopolysiloxane releasing agent composition for the thermally sensitive paper according to the present invention, in order to solve the problem set forth above more preferably, may be a thermal/energy beam curable composition that is curable through a combination of heating and an energy beam, such as ultraviolet radiation, or the like, which may further include (E) a photopolymerization initiator. Additionally, the composition set forth above more preferably is a composition of a solvent-free type.

The problems to be solved by the present invention are solved more preferably through a thermally sensitive paper that has a releasing layer wherein the curable organopolysiloxane releasing agent composition for a thermally sensitive paper, described above, is cured, and, in particular, a thermally sensitive paper wherein the releasing layer is formed on the thermally sensitive coloring layer or on an intermediate layer that is formed on the thermally sensitive coloring layer. Additionally, it may be a label, or the like, that includes these thermally sensitive papers. These labels may be used as a thermally sensitive printing label sheet, and, in particular, as a linerless thermally sensitive printing label sheet.

The problem to be solved by the present invention is solved by a method for manufacturing a thermally sensitive paper, or a label that includes the same, that includes the following steps (I) and (II):

Step (I): A step for coating, onto a substrate that is provided with a thermally sensitive coloring layer, a curable organopolysiloxane releasing agent composition for a thermally sensitive paper as described above; and Step (II): A step for curing, at a temperature that substantially does not cause color development or discoloration of the thermally sensitive coloring layer, and preferably at between 70 and 100° C., the curable organopolysiloxane releasing agent composition for the thermally sensitive paper, on the substrate, to form a releasing layer.

In particular, the problem to be solved by the present invention is solved through a method for manufacturing a thermally sensitive paper, or a label including the same, that includes the following steps (I') and (II") when the curable organopolysiloxane releasing agent composition for the thermally sensitive paper, described above, includes a (E) photopolymerization initiator, and is to be cured through a combination of heating and an energy beam such as ultraviolet radiation, or the like. In this case, preferably the heating temperature is in a range wherein substantially there is no color development or discoloration of the thermally sensitive coloring layer described above (preferably, between 70 and 100° C.), and preferably the energy beam is ultraviolet radiation:

Step (I'): A step for coating, onto a substrate that is provided with a thermally sensitive coloring layer, a curable organopolysiloxane releasing agent composition for a thermally sensitive paper, described above, that includes (E) a photopolymerization initiator; and Step (II'): A step for curing, through a combination of heating and an energy beam, the curable organopolysiloxane releasing agent composition for the thermally sensitive paper, to form a releasing agent on the substrate.

Effects of the Invention

The curable organopolysiloxane releasing agent composition for a thermally sensitive paper according the present invention does not have problems such as gellification, and has an adequate pot life, even when the solution is prepared at room temperature, with superior ease of handling, and even when coated onto the thermally sensitive coloring layer of a thermally sensitive paper and cured for a short time at a low temperature of no greater than 100° C., curing failures substantially do not occur, enabling formation of a releasing layer with high adhesion and a good peeling force. Moreover, the use of the releasing agent composition described above enables provision of a thermally sensitive paper and label, and a manufacturing method thereof, where a releasing layer with superior peelability and adhesion is provided, having industrial manufacturability, and wherein there is no problem with color development or discoloration of the thermally sensitive coloring layer at the time of manufacturing.

[Form for Carrying Out the Present Invention]
[Curable Organopolysiloxane Releasing Agent Composition for Thermally Sensitive Paper]

The curable organopolysiloxane composition according the present invention will be explained first. In order to solve the problem described above, the curable organopolysiloxane composition according the present invention is a curable organopolysiloxane composition wherein the application and function thereof is limited to use for the purpose of forming a release layer as a top coat layer on the surface of a thermally sensitive paper that can be printed by a printer that has a thermal head, wherein a thermally sensitive coloring layer is provided on the entirety or a portion of a sheet-shaped substrate that is primarily a paper or a resin film. The composition according the present invention is selectively designed for the purpose of solving the problems that are unique to thermally sensitive papers because, as indicated in the section on the Problem Solved by the Present Invention, there has been no easy and comprehensive solution for the issues unique to thermally sensitive papers using other means in the composition or in manufacturing.

The curable organopolysiloxane releasing agent composition according the present invention includes: (A) one or more types of organopolysiloxanes having an alkenyl group with a number of carbon atoms between 4 and 12, where the inclusion proportion of the vinyl (CH2=CH—) within the alkenyl group is between 0.5 and 3.0 mass %; (B) an organohydrogen polysiloxane having at least two silicon-bonded hydrogen atoms (Si—H) in a single molecule; (C) a hydrosilylation reaction catalyst; and (D) a hydrosilylation reaction inhibiting agent, and preferably includes (E) a photopolymerization initiator, and other arbitrary components. Moreover, the curable organopolysiloxane composition according the present invention may be of a solvent type or a solvent-free type, and preferably is a composition of a solvent-free type.

The component (A) is one or more types of organopolysiloxanes having an alkenyl group with a number of carbon atoms between 4 and 12, where the inclusion proportion of the vinyl (CH2=CH—) within the alkenyl group is between 0.5 and 3.0 mass %, and must be an organopolysiloxane that essentially does not include, or absolutely does not include, an alkenyl group having less than 4 carbon atoms, bonded to a silicon atom. The alkenyl group of between 4 and 12 carbon atoms, bonded to a silicon atom in component (A) includes a hexenyl group, and preferably the inclusion proportion of the vinyl ($CH_2$=CH—) part in the hexenyl group is in a range between 0.5 and 3.0 mass %, and more preferably in a range between 1.0 and 2.0 mass %. There are no particular limitations on other organic groups in the component (A), which may be, for example, a hydroxyl group (silanol group), or an alkyl group with between 1 and 20 carbon atoms, which may be substituted with fluorine atoms, a phenyl group, or the like. From the perspective of production in industry, preferably the other organic group is a methyl group or a phenyl group, but from the perspective of improving releasing properties, an alkyl group with three or more carbon atoms, substituted with a fluorine atom, in particular, may be included.

While there is no particular limitation on the degree of polymerization or viscosity of the component (A), preferably the viscosity at 25° C. is no less than 20 mPa·s. If the viscosity were less than this, it might be difficult to satisfy the range set forth above for the proportion for inclusion of alkenyl groups with between 4 and 12 carbon atoms. On the other hand, if the viscosity is no less than 20 mPa·s, then at 25° C. it may be in the form of a liquid or a rubber (a silicone polymer of a high degree of polymerization in a semi-solid state, normally with a viscosity of no less than 10,000,000 mPa·s, having plasticity) and from the perspective of coating performance, preferably the viscosity is in a range between 50 and 1000 mPa·s, and particularly preferably in a range between 100 and 500 mPa·s.

The (A) component, described above, may be selected from straight-chain organopolysiloxanes, branched organopolysiloxanes, and straight-chain or branched organopolysiloxanes that include partial cyclic structures, but, from the perspective of industry, preferably it is a straight-chain organopolysiloxane that can be expressed by Chemical Formula (1), below:

[CHEMICAL FORMULA 1]

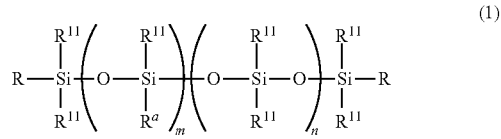

(1)

In Formula (1), $R^{11}$ each independently is an alkyl group with a number of carbon atoms of between 1 and 20 (for example, a methyl group, or the like), that is non-substituted or substituted with a halogen atom, an aryl group with between 6 and 22 carbon atoms (for example, a phenyl group, or the like), or a hydroxyl group, and preferably is a methyl group or phenyl group. $R^a$ is an alkenyl group with a number of carbon atoms between 4 and 12, where a hexenyl group is particularly preferred. R is a group that is expressed by $R^{11}$ or $R^a$. m is a number that is no less than 0, where n is a number that is no less than 1. Note that m, n, and R are numbers such that the inclusion proportion of the vinyl ($CH_2$=CH—) part in the alkenyl group with the number of carbon atoms of between 4 and 12 in the organopolysiloxane molecule expressed by Formula (1), above, will be between 0.5 and 3.0 mass %.

For example, if the R at both ends in Formula (1) are both alkenyl groups ($R^a$) with between 4 and 12 carbon atoms, then the inclusion proportion of the vinyl ($CH_2$=CH—) in the alkenyl groups would be expressed by the following equation:

{(molecular weight of the vinyl part of the $R^a$: approximately 27)×(m+2)}/total molecular weight×100 (mass %)

wherein the a1) component is an organopolysiloxane wherein, in Formula (1), above, the inclusion proportion of the vinyl (CH$_2$=CH—) part in the alkenyl group with between 4 and 12 atoms satisfies the condition of being in the range of between 0.5 and 3.0 mass %, and more preferably, in the range of between 1.0 and 2.0 mass %.

Particularly preferably, component (A) is an organopolysiloxane having hexenyl groups at both ends of the molecular chain and in a side chain, expressed by Chemical Formula (2), below:

[CHEMICAL FORMULA 2]

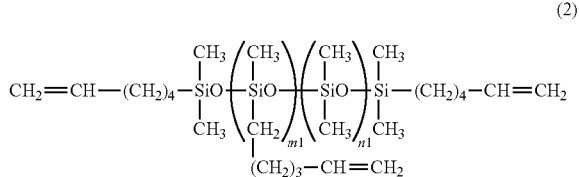

(2)

(In Formula (2), m1 is a number that is no less than 0, and n1 each is a positive number, wherein m1 is a number such that the inclusion proportion of the vinyl (CH$_2$=CH—) part in the hexenyl groups (—(CH$_2$)$_4$CH=CH$_2$) of the molecule expressed by Formula (2) will be in a range of between 0.5 and 3.0 mass %, and more preferably in a range of between 1.0 and 2.0 mass %. Moreover, m1+n1 is a number in a range wherein the viscosity, at 25° C., of the organopolysiloxane expressed by Formula (2) will be no less than 20 mPa·s, and, more preferably, a number so that it will be no less than between 100 and 500 mPa.

The composition according to the present invention is cured through a curing reaction that includes a hydrosilylation reaction, and in order to achieve good curability in a short time with a low temperature wherein the heating temperature is in a range of between 70 and 100° C., preferably does not include an alkenyl group with less than 4 carbon atoms, combined with a silicon atom, and, more specifically, substantially does not include an organopolysiloxane having a vinyl group or an allyl group. This is because compositions that include these alkenyl groups are not suitable for low temperature curing, so would interfere with solving the problem of the present invention, that of being a silicone releasing agent for a thermally sensitive paper. When substantially no organopolysiloxane that has an alkenyl group with less than four carbon atoms, combined with a silicon atom, is included here, this means that the inclusion proportion of that component in the composition is no greater than 5.0 mass % in respect to component (A), and, preferably, is no greater than 3.0 mass %, and, preferably, the inclusion proportion of that component to the composition as a whole is no greater than 5.0 mass %, and preferably no greater than 3.0 mass %, and is in a range of between 0 and 1.0 mass %.

Component (B) is an organohydrogen polysiloxane having no less than two silicon-bonded hydrogen atoms (Si—H) within a single molecule, and is the cross-linking agent in the present composition. This is a cross-linking agent for component (A), described above. Component (B) preferably has at least three silicon atom-bonded hydrogen atoms within a single molecule, and there is no particular limitation on the positions for bonding the hydrogen atoms in the molecule.

The inclusion proportion of silicon atom-bonded hydrogen atoms preferably is a value that will be between 0.1 and 2.0 mass % of the curable organopolysiloxane composition as a whole, and more preferably a value that will be between 0.5 and 1.8 mass %. Moreover, organic groups that are bonded to silicon atoms, other than two hydrogen atoms, included in component (B) may be, for example, alkyl groups such as methyl groups, ethyl groups, propyl groups, butyl groups, octyl groups, and the like, but preferably are methyl groups. Moreover, the molecular structure of the organohydrogen polysiloxane of component (B) may be, for example, a straight-chain structure, a branched structure, a branched cyclic structure, or a combination thereof. Note that the "number of silicon-bound hydrogen atoms within a single molecule" is the mean for all molecules.

The viscosity of component (B) at 25° C. is between 1 and 1000 mPa·s, and preferably between 5 and 500 mPa·s. This is because if the viscosity of component (B) at 25° C. were less than 1 mPa·s, there would be a tendency for component (B) to evaporate from within the curable organopolysiloxane composition wherein it is included, and if in excess of 1000 mPa·s, the curing time for the curable organopolysiloxane composition including such a component (B) would be too long. While there is no particular limitation on such a component (B), it may be, for example, a both-end trimethyl siloxy group-blocked dimethyl siloxane-methyl hydrogen siloxane copolymer, a both-end dimethyl hydrogen siloxy group-blocked dimethyl siloxane-methyl hydrogen siloxane copolymer, a both-end dimethyl hydrogen siloxy group-blocked dimethyl polysiloxane, a both-end trimethyl siloxy group-blocked methyl hydrogen polysiloxane, a cyclic methyl hydrogen polysiloxane, a cyclic methyl hydrogen siloxane-dimethyl siloxane copolymer, or the like.

Here, from the perspective of improving curability and adhesion on the thermally sensitive coloring layer of the composition according to the present invention, preferably component (B) uses, in parallel, two or more different organohydrogen polysiloxanes of different degrees of polymerization. Specifically, the (B) component in the composition described above may be an organohydrogen polysiloxane mixture wherein (B1) an organohydrogen polysiloxane wherein the viscosity at 25° C. is in a range of between 2.5 and 50 mPa·s, and (B2) an organohydrogen polysiloxane wherein the viscosity at 25° C. is in a range of between 100 and 500 mPa·s are mixed with a mass ratio in a range of between 50:50 and 90:10, and more preferably in a range of between 75:25 and 85:15. The use of a component (B2) that has a higher degree of polymerization, together with the component (B1) that has a low degree of polymerization, enables effective suppression of a phenomenon wherein the releasing layer tends to fall off from the thermally sensitive coloring layer of the thermally sensitive paper as time elapses, which, in practice, is extremely useful in a thermally sensitive paper application that involves extensive storage times in the form of a roll.

The blending quantities of the component (B) in the curable organopolysiloxane composition according the present invention are quantities such that the silicon atom-bonded hydrogen atoms in component (B) will be between 1.0 and 4.0 moles, and preferably quantities such that they will be between 1.0 and 3.0, in respect to one mole of carbon-carbon double bonds in the component (A). If the mole ratio were less than this lower limit value, there would be diminished curability of the curable composition produced, and if in excess of the upper limit, the releasing resistance of the releasing layer that is the top coat layer on the thermally sensitive paper produced would be too high, with the risk that it would not be possible to produce practical releaseability.

The component (C) is a hydrosilylation reaction catalyst, a catalyst for promoting an addition reaction (hydrosilylation reaction) between the silicon atom-bonded alkenyl groups that exist in the curable organopolysiloxane composition and the silicon atom-bonded hydrogen atoms. Preferably the hydrosilylation reaction catalyst is a hydrosilylation reaction catalyst that includes a platinum-based metal, and specifically may be, for example, chloroplatinic acid, an alcohol-modified chloroplatinic acid, an olefin complex of chloroplatinic acid, a complex of chloroplatinic acid and a ketone, a complex of chloroplatinic acid and a vinyl siloxane, platinum tetrachloride, a platinum ultra-powder, that wherein solid platinum is carried on an alumina or silica carrier, platinum black, an olefin complex of platinum, an alkynyl siloxane complex of platinum, a carbonyl complex of platinum, a platinum-based catalyst of a thermoplastic organic resin powder such as a methyl methacrylate resin, a carbonate resin, a polystyrene resin, or a silicone resin that includes any of the aforementioned platinum-based catalysts, or the like. In particular, preferably a platinum alkynyl siloxane complex such as a complex of chloroplatinic acid and divinyl tetramethyl disiloxane, a complex of chloroplatinic acid and tetramethyl tetravinyl cyclotetrasiloxane, a complex of platinum and divinyl tetramethyl disiloxane, a complex of platinum and tetramethyl tetravinyl cyclotetrasiloxane complex, or the like, is used.

The amount of the component (C) added to the curable organopolysiloxane composition should be a catalyst amount, and normally an amount such that the amount of platinum-based metal included in the component (C), in respect to the total mass of the curable organopolysiloxane composition according to the present invention, will be in a range of between 1 and 1000 ppm, and more preferably an amount such that it will be in a range between 5 and 500 ppm.

Component (D) is a hydrosilylation reaction inhibiting agent, and in the curable organopolysiloxane composition according the present invention, is a component that prevents gellification and curing at room temperature, to improve storage stability, and to cause peelability to be expressed when heating at 70° C. or more. The hydrosilylation reaction inhibiting agent may be an acetylene-based compound, an enyne compound, an organic nitrogen compound, an organic phosphorous compound, or an oxime compound. The specific compound may be an alkyne alcohol such as 2-methyl-3-butyn-2-ol, 3,5-dimethyl-1-hexyn-3-ol, 3-methyl-1-pentyn-3-ol, 2-phenyl-3-butyn-2-ol, 1-ethynyl-1-cyclohexanol (ETCH), or the like; an enyne compound such as 3-methyl-3-trimethylsiloxy-1-butyne, 3-methyl-3-trimethylsiloxy-1-pentyne, 3,5-dimethyl-3-trimethylsiloxy-1-hexyne, 3-methyl-3-pentene-1-yne, 3,5-dimethyl-3-hexen-1-yne, or the like; or an alkenyl siloxanes such as 1-ethynyl-1-trimethylsiloxycyclohexane, bis (2,2-dimethyl-3-butynoxy) dimethylsilane, methyl (tris (1,1-dimethyl-2-propynyloxy)) silane, 1,3,5,7-tetramethyl-1,3,5,7-tetravinylcyclotetrasiloxane, 1,3,5,7-tetramethyl-1,3,5,7-tetrahexenylcyclotetrasiloxane, or the like.

The amount of the (D) hydrosilylation reaction inhibiting agent added to the curable organopolysiloxane composition is normally in a range of between 0.001 and 5 parts by weight of the component (D) per 100 parts by weight of the component (A), but the preferred amount of the component (D) use can be determined easily, as appropriate, depending on the inclusion proportion of $C_4$ through $C_{12}$ alkenyl groups in the component (A), the amount of silicon atom-bonded hydrogen atoms in the component (B), and the desired usability time and operating environment for the curable composition. Additionally, in order to achieve the targeted usability time, the (D) hydrosilylation reaction inhibiting agent may be used as a single type, or in combination of two or more types thereof.

The curable organopolysiloxane composition according the present invention includes components (A) through (D), but may, and preferably does, include a (E) photopolymerization initiator. The component (E) is a component that endows the curable organopolysiloxane composition according to the present invention with an energy beam curability, such as through ultraviolet radiation, where the joint use of thermal curability and energy beam curability through the addition reaction has the benefits of enabling the curing reaction to take place more quickly at lower temperatures, and also of reducing damage, caused by heat, to the thermally sensitive coloring layer of the thermally sensitive paper that would be discolored through heat, and of improving adhesion to the thermally sensitive paper of the releasing layer according the present invention, and, in particular, to the thermally sensitive coloring layer that is the top coat layer. Moreover, it has the benefit of preventing soiling of the thermally sensitive paper by the silicon component through the second component transferring from the cured coating surface of the releasing layer according to the present invention (hereinafter termed "silica transferability"), and of further reducing the transferability of the silicon. Here the curable organopolysiloxane composition that includes the (E) photopolymerization initiator may be of a curing system wherein curing is through exposure to an energy beam after performing a thermal curing reaction, or of a curing system wherein a thermal curing reaction is carried out after carrying out energy beam exposure, or of a curing system wherein the heating and energy beam exposure are carried out simultaneously.

This type of component (E) may be that which is known as a compound for producing radicals through exposure to an energy beam such as ultraviolet radiation, or the like, and may use an arbitrary selection from organic peroxides, carbonyl compounds, organic sulfur compounds, azo compounds, and the like. The specific compound may be, for example, acetophenone, propiophenone, benzophenone, xanthol, fluorein, benzaldehyde, anthraquinone, triphenylamine, 4-methylacetophenone, 3-pentylacetophenone, 4-methoxyacetophenone, 3-bromoacetophenone, 4-allylacetophenone, p-diacetyl benzene, 3-methoxybenzophenone, 4-methylbenzophenone, 4-chlorobenzophenone, 4,4-dimethoxybenzophenone, 4-chloro-4-benzylbenzophenone, 3-chloroxantone, 3,9-dichloroxantone, 3-chloro-8-nonylxanthone, benzoin, benzoin methyl ether, benzoin butyl ether, bis (4-dimethylaminophenyl) ketone, benzylmethoxyketal, 2-chlorothioxanthone, diethylacetophenone, 1-hydroxycyclohexyl phenyl ketone, 2-methyl [4-(methylthio) phenyl] 2-morpholino-1-propanone, 2,2-dimethoxy-2-phenylacetophenone, and diethoxyacetophenone, or the like. When the composition according to the present invention is cured through ultraviolet radiation, preferably the component (E) is benzophenone, 4-methoxyacetophenone, 4-methylbenzophenone, diethoxyacetophenone, or 1-hydroxycyclohexyl phenyl ketone. Diethoxyacetophenone and 1-hydroxycyclohexyl phenyl ketone are particularly preferred as the component (E).

The (E) photopolymerization initiator described above may be of a single type, or two or more types may be used together. While there is no particular limitation on the blending quantity, it is in the range of between 0.01 and 10 parts by weight relative to 100 parts by weight of the component (A), and preferably in the range of between 0.01 and 2.5 parts by weight. If the blending quantity of the component (E) is in the range described above, the releasable cured coating produced through curing the composition of the present invention can be cured at a low temperature over a short time, the silicon transferability will be improved, and the material will have superior physical characteristics, such as strength, and the like.

The curable organopolysiloxane composition according the present invention may include an organic solvent arbitrarily. For example, in order to produce good ease of handling and coating performance, the composition that includes the components (A) through (E) may be dispersed or dissolved in a known organic solvent for use. Note that, insofar as it does not run counter to the object of the present invention, the components (A) through (E) may be dispersed or dissolved for use in a low viscosity liquid organopolysiloxane (for example, a straight-chain or cyclic organopolysiloxane that has low viscosity of between about 0.5 and 10 mPa·s at 25° C.) instead of the arbitrary organic solvent. The organic solvent may be an aromatic hydrocarbon solvent such as toluene or xylene, an aliphatic hydrocarbon solvent such as hexane, octane, or isoparaffin, a ketone solvent such as acetone, methylethyl ketone, or methyl isobutyl ketone, an ester solvent such as ethyl acetate or isobutyl acetate, an ether solvent such as diisopropyl ether or 1,4-dioxane, a cyclic polysiloxane with a degree of polarization between 3 and 6 such as hexamethylcyclictrisiloxane, octamethylcyclotetrasiloxane, and decamethylcyclopentasiloxane, or a halogenated hydrocarbon such as trichloroethylene, perchloroethylene, trifluoromethyl benzene, 1,3-bis (trifluoromethyl) benzene, methylpentylfluorobenzene, or the like.

However, in the present invention, that which is to be coated by the composition is primarily a thermally sensitive paper wherein the substrate is paper, where the thermally sensitive coloring layer includes components such as color developing agents, or the like, that may react with, or be dissolved by, organic solvents, and thus preferably a solvent-free type composition that substantially includes no organic solvent is selected.

Other arbitrary components, in addition to the components described above, may be added to the curable organopolysiloxane composition according to the present invention in a range that does not interfere with the object of the present invention. The other arbitrary components may be, for example, adhesion promoting agents made from alkoxy silane compounds such as 3-glycidoxypropyltrimethoxysilane and 3-methacryloxypropyltrimethoxysilane, and the like; oxidation inhibitors such as those that are phenol-based, quinone-based, amine-based, phosphor-based, phosphide-based, sulfur-based, thioether-based, and the like; optical stabilizers such as those that are triazole-based and benzophenone-based, and the like; flame retardants such as those that are phosphoric acid ester-based, halogen-based, phosphor-based, and antimony-based; surface activating agents that are cationic surface activating agents, anionic surface activating agents, and/or nonionic surface activating agents; and known additives such as antistatic agents, heat-resistant agents, dyes, pigments, and the like, where components selected therefrom may be added singly or in combinations of two or more thereof to the curable organopolysiloxane composition according to the present invention. Note that for the antistatic agent, known ionic or nonionic antistatic agents may be used without any particular limitation, and from the perspective of antistatic performance, not only may the antistatic agents described above be used as additives, but also the various components that structure the thermally sensitive paper may be subjected to treatment with antistatic agents that are surface activating agent-based, silicone-based, organic boron-based, conductive polymer-based, metal oxide-based, vapor deposited metal-based, and the like.

The curable organopolysiloxane composition according the present invention includes the component (A), component (B), component (C), component (D), and, arbitrarily, component (E), described above, and also may include other components through arbitrary selections. The curable composition according to the present invention preferably uses a solvent-free type of curable organopolysiloxane composition as the means for solving the problem of the present invention. In practice, preferably the curable organopolysiloxane composition according the present invention has a viscosity for the composition as a whole of between 100 and 100,000 mPa·s at 25° C., in order to produce good coating characteristics on the thermally sensitive coloring layer of the thermally sensitive paper, where the viscosity for the composition as a whole is more preferably in a range of between 100 and 50,000 mPa·s, and, in practice, a viscosity of between 100 and 20,000 mPa·s for the composition as a whole is preferred.

The curable organopolysiloxane composition according the present invention can form a cured coating having superior releasing characteristics, without producing a problem such as color development or discoloration of the thermally sensitive paper, through curing out at addition reaction in the presence of the component (C) at a temperature preferably between 70 and 100° C., wherein substantially no color development or discoloration occurs in the thermally sensitive color layer. Moreover, for the purposes of causing the curing reaction at a lower temperature with a shorter time, further improving the adhesion, to the thermally sensitive coloring layer, of the cured coating that is produced, and improving the physical characteristics and the releasing performance, the curable organopolysiloxane composition according the present invention may be cured through not just heating, but a combination with an energy beam (also known as a "chemical activating beam") such as ultraviolet radiation or an electron beam, and, in particular, through exposure to ultraviolet radiation. The curing time for the curable composition may be adjusted as appropriate depending on the curing conditions used. Note that it is also necessary to further mix the (E) photopolymerization initiator into the composition in order to endow the curable organopolysiloxane composition of the present invention with good ultraviolet radiation curability.

The composition of the present invention, when the aforementioned component (A) through component (D), and, depending on an arbitrary selection and the selection of the curing system, the component (E), along with other arbitrary components, are used, may be manufactured through mixing these components uniformly. There is no particular limitation on the sequence with which the individual components are added, but if the composition produced is not going to be used immediately after mixing, then the mixture of the component (A) and the component (B) should be stored separately from the component (C), and preferably use is immediately following mixing of the above. Moreover, particularly preferred is a composition that is designed so as to not cross-link at room temperature and so as to cure through a cross-linking rapidly when heating to a curing temperature that is set in advance, through adjusting the blending quantity of the component (D) in the composition that is made from the various components described above.

The curable organopolysiloxane composition according the present invention is coated uniformly, as a top coat layer/releasing layer, onto the surface of a thermally sensitive paper, and is heated under conditions that are adequate for cross-linking, through a hydrosilylation reaction, of the component (A) and the component (B), or exposed to an energy beam (for example, ultraviolet radiation, an electron beam, or the like), or subjected to both together, to produce a thermally sensitive paper having a cured silicone coating (that is, a cured organopolysiloxane coating) on the surface thereof. As described above, the curable organopolysiloxane composition according the present invention can be cured easily at a low temperature of between 70 and 100° C. rapidly, and due to the superior curability and adhesion, is suitable to provide, easily and at an industrial scale, thermally sensitive paper that is superior in thermal printing performance through a thermal head, or the like, through smooth feeding and printing at the time of use, even when rolled into a roll, without problems with color development or discoloration of the thermally sensitive coloring layer of the thermally sensitive paper, due to the superior curability and adhesion.

The cured coating (the releasable coating) produced through curing of the curable organopolysiloxane composition according the present invention is formed on the surface of the thermally sensitive paper, and is also termed a "top coat layer," because it exists on the surface of the thermally sensitive paper, and, focusing on the function thereof, is also termed a "releasing layer/protective layer." The curable organopolysiloxane composition according the present invention was designed for the purpose of forming a releasing layer, and preferably a releasable surface layer is formed on a portion or the entirety of the thermally sensitive paper surface. This structure is for enabling use for printing or labeling through feeding smoothly by pulling from the roll wherein the releasing layer that is formed through curing the curable organopolysiloxane composition described above faces the bottom face of the substrate layer, for a thermally sensitive paper that is rolled, in the case of rolling the thermally sensitive paper into a roll (or faces the adhesive layer in a linerless label).

While the structure of the thermally sensitive paper according the present invention is not limited in particular thereto, a releasing layer (=top coat layer) is provided through curing a thermally sensitive coloring layer, formed on a sheet-shaped substrate, with an intermediate layer, arbitrarily, and the curable organopolysiloxane composition described above, formed thereon. The thermally sensitive paper according the present invention further, arbitrarily, may be provided with adhesive layers between the individual layers, and an adhesive layer may be provided on the other surface of the sheet-shaped substrate. In particular, a pressure sensitive adhesive layer made from a silicone-based adhesive agent, an acrylic adhesive agent, or the like, may be provided on the other surface of the sheet-shaped substrate, with another releasing layer provided facing the pressure sensitive adhesive layer, where this sheet-shaped substrate may be used as an adhesive label sheet that includes the thermally sensitive paper according to the present invention, which form is included in a most preferred form of the present invention. Particularly preferably, it may be used as a linerless thermally sensitive printing label sheet having a structure wherein the adhesive layer, when rolled into the shape of a roll, faces the releasing layer on the thermally sensitive paper.

The sheet-shaped substrate for structuring the thermally sensitive paper may be that which is known conventionally, and various types of paper, such as high quality paper, coated paper, art paper, cast-coated paper, and the like, or synthetic paper, or a plastic sheet such as polyethylene terephthalate, acrylic, polyethylene, polypropylene, or the like, may be used. Because the curable organopolysiloxane composition described above is well suited to curing at a low temperature, it will essentially not cause damage through heating even for an extremely thin synthetic paper or plastic sheet, and thus has the benefit of enabling formation of a desirable thermally sensitive sheet, even for a substrate with relatively low thermal durability. The thickness of the sheet-shaped substrate is typically between 10 and 300 µm, and preferably between 15 and 200 µm, and particularly preferably between 20 and 125 µm.

The thermally sensitive coloring layer for structuring the thermally sensitive paper may use, without any particular limitation, any thermally sensitive coloring layer that is known conventionally. The thermally sensitive coloring layer can be formed through drying after coating the surface of the substrate with a coating solution that includes, as its main components, a coloring agent, a color developing agent, and a binding agent. As necessary, additives such as pigments, waxes, defoaming agents, and the like, sensitizing agents for increasing the thermal sensitivity of the thermally sensitive coloring layer, stabilizing agents for improving the storage performance, and the like, may be added to the mixture that is the material for the thermally sensitive coloring layer. Moreover, cross-linking agents for cross-linking the binding agent within the mixture, lubricants, and the like, may also be added to the mixture that is the material for the thermally sensitive coloring layer. The thermally sensitive coloring layer may be formed by coating the coating solution, which includes the materials described above, through a conventional known method, that is, through a method such as gravure coating, gravure reverse coating, roller coating, bar coating, die coating, slide coating, curtain coating, and the like. There is no particular limitation on the amount of coating for the thermally sensitive coloring layer, but preferably the solid content is between about 2.0 and 30.0 g/m$^2$.

In the color developing agent described above, a publicly known colorless or faintly colored leuco dye may be used, which may be, for example:

1) a triphenylmethane compound such as 3,3-bis (p-dimethylaminophenyl)-6-dimethylaminophthalide, 3-(p-dimethylaminophenyl)-3-(2-phenyl-3-indolyl) phthalide, 3-(p-dimethylaminophenyl)-3-(1,2-dimethyl-3-indolyl) phthalide, 3,3-bis (9-ethyl-3-carbazolyl)-5-dimethylaminophthalide, 3,3-bis (2-phenyl-3-indolyl)-5-dimethylaminophthalide, or the like;

(2) a diphenylmethane compound such as 4,4-bis (dimethylamino) benzhydrin benzyl ether, N-2,4,5-trichlorophenylleuco auramine, or the like;

(3) a xanthene compound such as rhodamine-β-anilino-lactam, 3-(N-methyl-N-cyclohexylamino)-6-methyl-7-anilinofluoran, 3-diethylamino-7-octylaminofluoran, 3-diethylamino-7-(2-chloroanilino) fluoran, 3-diethylamino-6-methyl-7-anilinofluoran, 3-diethylamino-6-methyl-7-(2,4-dimethylanilino) fluoran, 3-diethylamino-7-dibenzylaminofluoran, 3-diethylamino-6-chloro-7-(β-ethoxyethylamino) fluoran, 3-diethylamino-6-chloro-7-(7-chloropropylamino) fluoran, 3-(N-ethyl-N-isoamylamino)-6-methyl-7-anilinofluoran, 3-(N-ethyl-N-ethoxyethylamino)-6-methyl-7-anilinofluoran, 3-(N-ethyl-N-tetrahydrofurfurylamino)-6-methyl-7-anilinofluoran, 3-(N-ethyl-(N-tolylamino)-6-methyl-7-anilinofluoran, 3-dibutylamino-6-methyl-7-anilinofluoran, 3-dibutylamino-7-(2-chloroanilino) fluoran, 3-dipentylamino- 6-methyl-7-anilinofluoran, 3-piperidino-6-methyl-7-anilinofluoran, 3-(4-anilino) anilino-6-methyl-7-chlorofluoran, or the like;
(4) a thiazine compound such as benzoyl leucomethylene blue, p-nitrobenzoyl leucomethylene blue, or the like;
(5) a spiro compound such as 3-methylspirodinaphthopyran, 3-ethylspirodinaphthopyran, 3-benzylspirodinaphthopyran, 3-methylnaphtho-(3-methoxybenzo) spiropyran, or the like; or
(6) 3,5', 6-tris (dimethylamino)-spiro [9H-fluorene-9,1' (3'H)-isobenzofuran]-3'-one, 1,1-bis [2-(4-dimethylaminophenyl)-2-(4-methoxyphenyl) ethenyl]-4,5,6,7-tetrachloro (3H) isobenzofuran-3-one, or the like. These dyes may be used either singly or in mixtures of two or more of the above.

Moreover, the color developing agent may be, for example: that which is phenol-based, such as p-octylphenol, p-tert-butylphenol, p-phenylphenol, p-hydroxyacetophenone, α-naphthol, β-naphthol, p-tert-octylcatechol, 2,2'-dihydroxybiphenyl, bisphenol-A, 1,1-bis (p-hydroxyphenyl) butane, 2,2-bis (4-hydroxyphenyl) heptane, 2,2-bis-(3-methyl-4-hydroxyphenyl) propane, 2,2-bis (3,5-dimethyl-4-hydroxyphenyl) propane, 2,2-bis (3,5-dichloro-4-hydroxyphenyl) propane, bis (4-hydroxyphenyl) sulfone, bis (3-allyl-4-hydroxy phenyl) sulfone, bis (3,4-dihydroxyphenyl) sulfone, 2,4'-dihydroxyphenyl sulfone, 1,1-bis (4-hydroxyphenyl) cyclohexane, bis (4-hydroxyphenyl) ether, bis (2-(4-hydroxyphenylthio) ethoxy] methane, 4-(4-isopropoxybenzenesulfonyl) phenol, dimethyl 4-hydroxyphthalate, butyl bis (4-hydroxyphenyl) acetate, benzyl p-hydroxybenzoate, 3-5 di-tert-butylsalicylic acid, or the like; an organic carboxylic acid such as benzoic acid, or the like; that which is metal-based, such as such as zinc salicylate, or the like; or a color developer such as an anilide derivative such as 2,4-dihydroxy-N-2'-methoxybenzanilide. These color developing agents may be used either singly or in mixtures of two or more of the above.

Moreover, as the binding agent, an acrylic emulsion, a polyvinyl alcohol, methylcellulose, methoxycellulose, hydroxyethylcellulose, carboxymethylcellulose, a starch, polyvinylpyrrolidone, an acrylate, a polyacrylamide polymer, a styrene-maleic anhydride copolymer, a vinyl acetate-maleic anhydride copolymer, a styrene-butadiene copolymer or a denatured product thereof, may be selected.

Moreover, for the pigment, an inorganic pigment such as aluminum hydroxide, heavy calcium carbonate, light calcium carbonate, titanium oxide, barium sulfate, silica gel, activated clay, talc, clay, kaolinite, diatomaceous earth, magnesium carbonate, alumina, aluminum oxide, or the like, or an organic pigment such as polystyrene resin particles, urea-formalin resin particles, or polyolefin particles, or the like, etc., may be selected.

Moreover, the sensitizing agent may be, for example, a metal salt of an organic acid, such as zinc acetate, zinc octylate, zinc laurate, zinc stearate, zinc oleate, zinc behenate, zinc benzoate, zinc dodecyl salicylate, calcium stearate, magnesium stearate, aluminum stearate, or the like; an amide compound such as stearic acid amide, stearic acid methylolamide, stearoyl urea, acetanilide, acetotoluide, benzoic acid stearylamide, ethylenebisstearic acid amide, hexamethylenebisoctylic acid amide, or the like; or 1,2-bis (3,4-dimethylphenyl) ethane, m-terphenyl, 1,2-diphenoxyethane, 1,2-bis (3-methylphenoxy) ethane, p-benzylbiphenyl, p-benzyloxy biphenyl, diphenyl carbonate, bis (4-methylphenyl) carbonate, dibenzyl oxalate, bis (4-methylbenzyl) oxalate, bis (4-chlorobenzyl) oxalate, 1-hydroxy-2-naphthalenecarboxylate phenyl, 1-hydroxy-2-naphthalenecarboxylate benzyl, 3-hydroxy-2-naphthalenecarboxylate phenyl, methylenedibenzoate, 1,4-bis (2-vinyloxyethoxy) benzene, 2-benzyloxynaphthalene, 4-benzyloxybenzoic acid benzyl, dimethyl phthalate, dibenzyl terephthalate, dibenzoylmethane, 4-methylphenoxy-p-biphenyl, and so forth. These sensitizing agents may be used either singly or in mixtures of two or more of the above.

Moreover, the storage stabilizing agent may be, for example, a hindered phenol compound such as 1,1,3-tris (2-methyl-4hydroxy-5-tert-butylphenyl) butane, 1,1,3-tris (2-methyl-4-hydroxy-5-cyclohexylphenyl) butane, 4,4'-butylidenebis (2-tert-butyl-5-methylphenol), 4,4'-thiobis (2-tert-butyl-5-methylphenol), 2,2'-thiobis (6-tert-butyl-4-methylphenol), 2,2'-methylenebis (6-tert-butyl-4-methylphenol), or 4-benzyloxy-4'-(2-methylglycidyloxy) diphenylsulfone, sodium-2,2'-methylenebis (4,6-di-tert-butylphenyl) phosphate, or the like, where these storage stabilizing agents may be used either singly or in mixtures of two or more of the above.

In the thermally sensitive coloring layer that includes these components, nitrogen compounds, phosphorus compounds, sulfur compounds, and the like are included, which typically cause poisoning of the hydrosilylation reaction catalyst, which may reduce the curing performance, but because in the curable organopolysiloxane composition according to the present invention the composition that includes, as main ingredients, organopolysiloxane and a cross-linking agent is optimized for thermally sensitive paper, it has the benefit of being cured rapidly at a low temperature so as to be resistant to producing color development or discoloration of the thermally sensitive coloring layer, through rapid curing at a low temperature, even on a thermally sensitive coloring layer.

The releasing layer made through curing the curable organic polysiloxane composition described above may be formed on the thermally sensitive coloring layer described above, but an arbitrary intermediate layer may also be provided on the thermally sensitive coloring layer, with the releasing layer, described above, formed thereon. The intermediate layer in the thermally sensitive paper according to the present invention may have the function of preventing permeation of the components that structure the releasing layer, and the like, preventing unintentional color development of the thermally sensitive coloring layer, and may also have the function of increasing the luster of the releasing layer that is the outermost surface. Moreover, in order to develop the thermally sensitive coloring layer and to make the printing easy to read, an intermediate layer with high transparency is used. The intermediate layer may be formed through a method that is similar to the coating method explained above for the thermally sensitive coloring layer. The amount of coating of the intermediate layer has a solids content of between 1.0 and 10.0 g/m$^2$, and, preferably, may be formed at between 2.0 and 7.0 g/m$^2$.

The arbitrary intermediate layer in the thermally sensitive paper according to the present invention may be structured with a water-soluble resin as the main component thereof. The water-soluble resin may be, for example, a polyvinyl alcohol, starch, modified starch, gum arabic, gelatin, casein, chitosan, methylcellulose, hydroxyethylcellulose, hydroxymethylcellulose, polyvinylpyrrolidone, polyacrylate, polyacrylamide, a polyester resin, a styrene-acrylate copolymer resin, a styrene-maleic anhydride copolymer resin, a methyl vinyl ether-maleic anhydride copolymer resin, an isopropylene-maleic anhydride copolymer resin, or the like.

A commercially available product may be used as the substrate that has the thermally sensitive coloring layer. This type of substrate paper may be, for example, of the "Thermal" or "NPi Thermal" series (for example, the TP50KS series, TP55KJ series, TP60KS series, TP77KS series, TP78KS series, TF50KS series, TF58KS series, TF77KS series, or the like), manufactured by Nippon Paper Industries Co., Ltd., the PD series or KLT series manufactured by Oji Paper Co., Ltd., the Thermal Label/Thermal Paper 150LA series, 135LA series, PD series, 150LHB series, 150LCS series, 150TAB series, or the like, manufactured by Ricoh Corporation, or the like. Thermally sensitive papers and thermally sensitive printing labels wherein releasing layers are formed through curing of the curable organopolysiloxane composition according to the present invention on the surfaces of the materials listed above are included in the scope of the present invention.

The method for coating the curable organopolysiloxane composition according to the present invention onto the thermally sensitive paper (specifically, onto the thermally sensitive coloring layer or onto the intermediate layer that is formed on the thermally sensitive coloring layer) may be carried out using an arbitrary known method, but may be, for example, a gravure coating method, a bar coating method, a spray coating method, a spin coating method, a knife coating method, a roller coating method, a die coating method, or the like.

When the curable organopolysiloxane composition according the present invention is coated onto the thermally sensitive paper and cured, there is no particular limitation on the thickness of the cured organopolysiloxane composition layer, but between 0.01 and 3 µm is preferred, and between 0.03 and 1 µm is even more preferred. If the thickness of the layer of the organopolysiloxane composition that is cured on the thermally sensitive paper were less than 0.01 µm, an adequate function as a releasing layer for the thermally sensitive paper may not be produced. On the other hand, if the thickness of the layer of the organopolysiloxane composition cured on the thermally sensitive paper were in excess of 3 µm, then blocking may occur when the thermally sensitive paper produced is rolled into a roll.

When the curable organopolysiloxane composition according to the present invention is coated onto a thermally sensitive paper and cured, preferably, in order to prevent color development or discoloration of the thermally sensitive coloring layer of the thermally sensitive paper, the curing temperature is in a range between 60 and 120° C., and particularly preferably is selected in a range of between 65 and 110° C., or between 70 and 100° C., a temperature wherein color development and discoloration of the thermally sensitive coloring layer substantially does not occur. Moreover, while the curing time can be selected arbitrarily in the temperature range described above, preferably it is selected in a range of between 15 and 90 seconds, and particularly preferably in a range between 20 and 75 seconds. Note that through jointly using high-energy beam curing, for example, ultraviolet radiation curing, more rapid curing conditions at lower temperatures can be selected, which is more preferable in manufacturing thermally sensitive paper. On the other hand, if a high temperature in excess of 120° C., or a heating time over an extended interval of 90 seconds or more, were selected, there would be a tendency for color development or discoloration of the thermally sensitive coloring layer to occur, which would have a negative effect on the quality of the thermally sensitive paper. Moreover, because this would involve increased production costs or cycle times, this would be undesirable in industrial production.

Suitably, the thermally sensitive paper, or the label including the same, according to the present invention can be produced through a manufacturing method that includes:

Step (I): a step for coating the curable organopolysiloxane releasing agent composition for a thermally sensitive paper, according the present invention, onto a substrate that comprises a thermally sensitive coloring layer; and Step (II): A step for curing, at a temperature that substantially does not cause color development or discoloration of the thermally sensitive coloring layer, and suitably at between 70 and 100° C., the curable organopolysiloxane releasing agent composition for the thermally sensitive paper, on the substrate, to form a releasing layer. Here the coating method, the structure of the thermally sensitive paper that is the substrate that is equipped with the thermally sensitive coloring layer, and so forth, are as described above, where the curing conditions in Step (II) can be designed in a range that is even more preferable than the range described above.

Similarly the thermally sensitive paper, or label including the same, according to the present invention may be produced through a manufacturing method including:

Step (I'): A step for coating, onto a substrate that is provided with a thermally sensitive coloring layer, a curable organopolysiloxane releasing agent composition for a thermally sensitive paper, which includes the component (E) that is described above; and Step (II'): A step for curing, through a combination of heating and an energy beam, the curable organopolysiloxane releasing agent composition for the thermally sensitive paper, to form a releasing agent on the substrate. Here the coating method, the structure of the thermally sensitive paper that is the substrate that is equipped with the thermally sensitive coloring layer, and so forth, are as described above, where the curing conditions in Step (II) can be designed in a range that is even more preferable than the range described above.

The thermally sensitive paper, or label including the same, according to the present invention may be used as a thermally sensitive printing label sheet, and particularly as a linerless thermally sensitive printing label sheet. Preferably these labels are equipped with a releasing layer formed through curing a curable organopolysiloxane composition according the present invention, formed on the thermally sensitive coloring layer and the top layer, formed on one surface of a sheet-shaped substrate that is structured from thermally sensitive paper, and is equipped with a pressure sensitive adhesive layer formed from an arbitrary adhesive agent, such as a silicone-based adhesive agent or an acrylic adhesive agent, on the surface on the other side, and also, preferably, has the form of a layered body that has another releasing surface that faces the pressure sensitive adhesive layer, described above. Such a thermally sensitive printing label sheet, through the provision of the releasing layer that is formed through curing the curable organopolysiloxane composition according to the present invention on the surface of the thermally sensitive paper, can be printed through a thermal head through feeding by pulling off smoothly when rolled into the form of a roll, and, after printing, the thermally sensitive printing label, provided with the pressure sensitive adhesive layer, can be peeled from the substrate tape of the layered body and adhered to a desired location, or may be a linerless layer that is equipped with a pressure sensitive adhesive layer, peeled directly from the releasing surface of the thermally sensitive paper surface, to be adhered to the desired location. The use of the releasing layer formed through curing of the curable organopolysiloxane composition according the present invention enables the provision of a printable linerless thermally sensitive printing label sheet that is rolled into the shape of a roll and that can be fed out smoothly at the time of use, without producing problems with color development or discoloration of the thermally sensitive coloring layer of the thermally sensitive printing label sheet.

The thermally sensitive paper according the present invention of course may use a normal thermally sensitive printer paper, without the provision of an adhesive layer or a pressure sensitive adhesive layer on the sheet-shaped substrate that forms the thermally sensitive paper.

The thermally sensitive paper, or the label including the same, described above, given ease in miniaturization through the use of a small thermal head, in particular, and given inexpensive maintenance and ease in operation, can be used preferably as a medium for printing media for printers, facsimile machines, automatic ticket vending machines, or as a recording medium for a scientific measurement instrument, or the like, or as a medium for various types of printers for POS labels, CAD, CRT medical imaging, or the like, or for a medium for a mobile terminal printer used for meter reading, product inspection, foodstuff labeling, or the like.

EMBODIMENTS

The present invention will be explained in greater detail below through presenting embodiments of the present invention along with reference examples; however, the present invention is not limited to the embodiments set forth below. Moreover, in the examples below, "parts" that indicate quantities mean "parts by weight." Moreover, a vinyl ($CH_2$=CH—) part indicates a vinyl ($CH_2$=CH—) group part that is a site that includes a carbon-carbon double bond in an alkenyl group that is bonded to a silicon atom, where the inclusion proportion of the vinyl part occupied in the total weight of the molecule indicates a mass %, and when the alkenyl group is a vinyl group, means simply the "vinyl group inclusion proportion." "Viscosity" is a value that is measured at 25° C. The method for measuring plasticity is as described above, and the viscosity measurement is carried out using a Digital Display B-type rotary viscometer (Vismetron VDA2, manufactured by Toshiba Systems Corporation). Moreover, the releasing resistance value (peeling force) of the layer of the cured material made from the curable organopolysiloxane composition is measured through the method presented below.

[Method for Forming the Cured Layer]

A printing suitability tester (RI-2, Tester Sangyo Co., Ltd.) was used to coat the curable organopolysiloxane composition in an amount that would produce 1.00 g/m², as a solid content equivalent value, onto the surface of a commercially available thermally sensitive paper (Thermal Paper 135LA-1, manufactured by Ricoh Co., Ltd.). After coating, the substrate on which the composition set forth above had been coated was subjected to a heating process under the conditions shown in the various tables in a hot air circulation-type oven, or exposed to ultraviolet radiation after heating, to form a cured layer of an organopolysiloxane on the thermally sensitive paper surface.

[Evaluation of Cureability]

Each composition was coated onto the same commercially available thermally sensitive paper described above (Thermal Paper 135LA-1, manufactured by Ricoh Co., Ltd.) using the printing suitability tester (RI-2, Tester Sangyo Co., Ltd.), and subjected to a heating process for 30 seconds at various temperatures of 80° C., 90° C., 100° C., and 110° C., and, for Embodiment 2, was further subjected to exposure to ultraviolet radiation, after which the forms of the various cured layer coatings were evaluated by strongly rubbing the coating surface with a finger five times (5 reciprocations), and evaluating visually whether or not there is clouding (smearing) using the reference below:

○: No clouding (smearing) visible on the coated surface even after rubbing the coated surface with a finger
Δ: Slight clouding (smearing) found on the coated surface after rubbing the coated surface with the finger
x: Clouding (smearing) found on the coated surface after rubbing the coated surface with the finger

[Pot Life: Usable Time Period at 40° C.]

Each composition, after mixing, was stored at 40° C., to measure the time until gellification of the entire composition. If the composition was not gellified after four hours, the evaluation was a ○, as the usable time period being adequate for practical use, where if the time until gellification of the composition was one hour or less, than the evaluation was x, as the usable time period being inadequate.

[Peeling Force Evaluation: Initial Peeling Force (One-Day Curing) and Time-Elapsed Peeling Force (One-Week Curing)]

The solvent-free releasable cured coated formable silicon composition of the embodiments and reference examples were coated in an amount to produce a 1.0 g/m² siloxane equivalent onto a commercially available thermally sensitive paper (Thermal Paper 135LA-1, manufactured by Ricoh Co., Ltd.) using a printing suitability tester (Tester Sangyo Co., Ltd., RI-2) followed by curing for 30 seconds at 100° C. to produce the cured coating. After this was further cured for one day under 25° C., 60% humidity conditions, an applicator was used to coat the cured coating surface uniformly with an acrylic emulsion-type adhesive agent (brand name: Olivine BPW6116A, manufactured by Toyo Ink Co., Ltd.) to have a wet thickness of 100 μm, followed by drying for two minutes at 100° C. This was followed by layering a layered paper thereon, and applying a load up 20 g/cm² thereto, and storing for one day under conditions of 25° C. with a humidity of 60%. Following this, the result of measuring the peeling force when pulling the layered paper, using a pull tester, in 180° directions at a speed of 0.3 m/min was evaluated as the initial peeling force.

On the other hand, a cured coating was produced in the same manner as described above, and after curing for another week under conditions of 25° C. and a humidity of 60%, the result of measuring the peeling force using the pull tester in the same manner as described above was evaluated as the time-elapsed peeling force. Note that the sample widths were 5 cm for all, and no measurement of peeling force was carried out when the evaluation was a curing failure in the peelability evaluation, described above.

[Surface Color Development Evaluation of the Thermally Sensitive Paper]

The curable organopolysiloxane compositions described above were coated onto the surface of a commercially available thermally sensitive paper (Thermal Paper 135LA-1, manufactured by Ricoh Co., Ltd.), followed by heating for a prescribed time (30 seconds) under various curing conditions, followed by evaluating whether or not there was color development of the thermally sensitive paper, using the standards below:

Color Development Absent (○): No color development was observed in the thermally sensitive paper after heating (white).

Color Development Present (●): Slight blackening of the thermally sensitive paper surface after heating, with the white paper becoming gray.

Note that, for both the compositions used in the examples and in the reference embodiments, the results were dependent only on the heating temperature and heating time of the thermally sensitive paper, and are thus shown together on the left side of Table 1. In these test conditions, discoloration of the thermally sensitive paper occur in heating at 110° C. for 30 seconds, and thus these conditions are undesirable as curing conditions.

[Evaluation of Adhesion of Releasing Layer]

Similar to the evaluation of the curability, described above, the cured layers of organopolysiloxane (=releasing layers) were formed on thermally sensitive paper surfaces, and, for the various conditions shown in Table 2, the adhesion of the releasing layers to the thermally sensitive papers were evaluated. The adhesion was evaluated by rubbing the coating surface strongly with a finger five times (five reciprocations) and evaluating whether or not the coating came off (rubbed off).

○: The releasing layer did not come off from the thermally sensitive paper.

Δ: Some slight occurrence of the releasing layer coming off from the thermally sensitive paper.

x: The releasing layer came off the thermally sensitive paper.

[Embodiment 1] Composition 1

A curable organopolysiloxane composition was produced through uniformly mixing: (A) 93.76 parts of a polydimethyl sulfoxide having hexenyl groups on both ends of the molecular chain and on a side chain (viscosity of 200 mPa·s, with the inclusion proportion for the vinyl ($CH_2=CH-$) part in the hexenyl groups being 1.15 mass %), (B1-1) 3.00 parts dimethyl methylhydrogen polysiloxane blocked with trimethyl siloxy groups on both ends of the molecular chain, with a viscosity of 25 mPa·s, (B1-2) 3.00 parts dimethyl methylhydrogen polysiloxane blocked with trimethyl siloxy groups on both ends of the molecular chain, with a viscosity of 20 mPa·s, (C) an amount of a chloroplatinic acid/1,3-divinyl-1,1,3,3-tetramethyl disiloxane complex (platinum metal inclusion proportion: 0.6 mass %) such that the amounts of platinum metal in the overall composition were 195 and 260 ppm; and (D1) 0.23 parts 1-ethenyl-1-cyclohexanol (ETCH) and 0.01 parts methyl (tris (1,1-dimethyl-2-propynyloxy)) silane. For the compositions of each of the amounts of platinum, cured layers were formed on thermally sensitive papers through the curing temperatures and curing times shown in Table 1 in a hot air circulating oven, where the results of the evaluations of curability, and the like, are shown in Table 1. Note that in Composition 1 the substance ratio of the silicon atom-bonded hydrogen atoms in the (B1-1) and (B1-2) components to the vinyl part in the (A) component (=SiH/Vi ratio) was 1.95.

[Embodiment 2] Composition 2

A curable organopolysiloxane composition was produced in the same manner as in Embodiment 1, except for the further addition, to Composition 1, described above, of (E) 0.01 parts of diethoxy acetophenone. For the compositions with each of the amounts of platinum, cured layers were formed on thermally sensitive papers with the curing temperatures and curing times shown in Table 1, and the curabilities thereof are shown in Table 1. However, Composition 2 is ultraviolet radiation curable, and thus after the cured layer was formed on the thermally sensitive paper with the curing temperatures and curing times shown in Table 1 in a hot air circulating oven, it was further exposed to ultraviolet radiation (Eye Grande, by Eye Graphics Co., Ltd., total radiation dose: 110 mJ/cm$^2$), to form a cured layer on the thermally sensitive paper, where the results of evaluations of curability, etc., are given in Table 1. The SiH/Vi ratio for Composition 2 was 1.95, the same as for Composition 1.

[Reference Example 1] Reference Composition 1

A curable organopolysiloxane composition was produced in the same manner as in Embodiment 1, except for mixing in (AX) 93.76 parts of a polydimethyl siloxane having vinyl groups on both ends of the molecular chain and on a side chain (viscosity: 200 mPa·s, vinyl ($CH_2=CH-$) group inclusion proportion: 1.20 mass %), instead of the component (A), and, for Component (C), mixing in the platinum metal in amounts of 195, 260, and 325 ppm in the composition as a whole. For the compositions of each of the amounts of platinum, cured layers were formed on thermally sensitive papers through the curing temperatures and curing times shown in Table 1 in a hot air circulating oven, where the results of the evaluations of curability, and the like, are shown in Table 1. Note that in Reference Composition 1 the substance ratio of the silicon atom-bonded hydrogen atoms in the (B1-1) and (B1-2) components to the vinyl part in the (AX) component (=SiH/Vi ratio) was 1.96.

[Reference Example 2] Reference Composition 2

A curable organopolysiloxane composition was produced in the same manner as in Embodiment 1, except for using (AX) 90.76 parts of a polydimethyl siloxane having vinyl groups on both ends of the molecular chain and on a side chain (viscosity: 200 mPa·s, vinyl ($CH_2=CH-$) group inclusion proportion: 1.20 mass %), instead of the component (A), mixing in (B1-1) 4.50 parts dimethyl methylhydrogen polysiloxane blocked with trimethyl siloxy groups on both ends of the molecular chain, with a viscosity of 25 mPa·s, and (B1-2) 4.50 parts dimethyl methylhydrogen polysiloxane blocked with trimethyl siloxy groups on both ends of the molecular chain, with a viscosity of 20 mPa·s, and, for Component (C), mixing in the platinum metal in amounts of 195, 260, and 325 ppm in the composition as a whole. For the compositions of each of the amounts of platinum, cured layers were formed on thermally sensitive papers through the curing temperatures and curing times shown in Table 1 in a hot air circulating oven, where the results of the evaluations of curability, and the like, are shown in Table 1. Note that in Reference Composition 2 the substance ratio of the silicon atom-bonded hydrogen atoms in the (B1-1) and (B1-2) components to the vinyl part in the (AX) component (=SiH/Vi ratio) was 3.00.

TABLE 1

| Embodiments | Embodiment 1 (Using hexenyl groups) SiH/Vi = 1.95 | | Embodiment 2 (Using hexenyl groups) *Together with UV curing SiH/Vi = 1.95 | | Reference Example 1 (Using vinyl groups) SiH/Vi = 1.96 | | | Reference Example 2 (Using vinyl groups) SiH/Vi = 3.00 | | | For all: Discoloration of Thermally Sensitive Paper |
|---|---|---|---|---|---|---|---|---|---|---|---|
| Amount of Platinum (Pt) Catalyst ppm | 195 | 260 | 195 | 260 | 195 | 260 | 325 | 195 | 260 | 325 | — |
| Curing Conditions 80° C. × 30 s | X | ○ | ○ | ○ | X | X | X | X | X | X | ○ |
| 90° C. × 30 s | Δ | ○ | ○ | ○ | X | X | X | X | X | Δ | ○ |
| 100° C. × 30 s | ○ | ○ | ○ | ○ | X | X | X | X | X | ○ | ○ |
| 110° C. × 30 s | ○ | ○ | ○ | ○ | X | X | Δ | X | ○ | ○ | ● |
| Peeling Force (mN/5 cm) * 100° C. × 30 s  Initial: One-day curing | 360 | 320 | 280 | 270 | — | — | — | — | — | 950 | — |
| Time-elapsed: One-week curing | 290 | 290 | 260 | 270 | — | — | — | — | — | 700 | — |
| Pot life at 40° C. (Does not gellify for at least 4 hours) | ○ | ○ | ○ | ○ | ○ | ○ | ○ | ○ | ○ | X | — |

Summary of Embodiments 1 Through 2 and Reference Example 1

Given whether or not there was discoloration of the thermally sensitive paper, when a releasing layer was formed using the curable organopolysiloxane composition on the thermally sensitive paper, it was necessary to use a temperature of less than 1100 for a curing time of 30 seconds, and curing at a temperature of more than that could not solve the problem in the present invention effectively. Here, in Embodiment 1 and Embodiment 2, for both of the amount of the platinum (Pt) catalyst, 195 ppm and 260 ppm, the releasing layer could not be formed on the thermally sensitive paper at a low temperature of no more than 100° C., and the peeling force was in a range between 260 and 360 mN/5 cm, and exhibited a relatively light peeling force. Additionally, the composition had a pot life that was adequate for practical purposes, without gellification for at least 4 hours at 40° C.

On the other hand, in Reference Example 1, the releasing layer could not be formed on the thermally sensitive paper at a low temperature of no greater than 100° C. Moreover, in Reference Example 2, while the releasing layer could not be formed on the thermally sensitive paper at a low temperature of no greater than 100° C. when the amount of platinum (Pt) catalyst was designed to 325 ppm, the initial peeling force was an extremely heavy peeling force of 950 mN/5 cm, and there was an extremely large change in peeling force after time elapsed. Furthermore, because the composition gellifies within one hour at 40° C., the ease of handling in an industrial production process is remarkably bad. For the reasons described above, even when the amount of the platinum (Pt) catalyst was designed to 325 ppm in the composition in Reference Example 2, it was not suitable for a releasing agent composition for use with a thermally sensitive paper.

[Embodiment 3-1] Composition 3-1

An additional (B2) 0.50 parts of dimethyl methyl hydrogen polysiloxane blocked with trimethylsiloxy groups on both ends of the molecular chain, with a viscosity of 200 mPa·s was added to Composition 1, above, to produce a Composition 3-1. Note that in Composition 1 the substance ratio of the silicon atom-bonded hydrogen atoms in the (B1) through (B3) components to the vinyl part in the (A) component (=SiH/Vi ratio) was 2.16.

[Embodiment 3-2] Composition 3-2

An additional (B2) 1.0 parts of dimethyl methyl hydrogen polysiloxane blocked with trimethylsiloxy groups on both ends of the molecular chain, with a viscosity of 200 mPa·s was added to Composition 1, above, to produce a Composition 3-1. Note that in Composition 1 the substance ratio of the silicon atom-bonded hydrogen atoms in the (B1) through (B3) components to the vinyl part in the (A) component (=SiH/Vi ratio) was 2.36.

Composition 1, Composition 3-1, and Composition 3-2, above, were coated in an amount to produce 1.0 g/m² siloxane equivalent onto a commercially available thermally sensitive paper (Thermal Paper 135LA-1, manufactured by Ricoh Co., Ltd.) using a printing suitability tester (Tester Sangyo Co., Ltd., RI-2) followed by curing for 30 seconds at 100° C. to cure the various compositions onto thermally sensitive papers, to produce thermally sensitive papers equipped with releasing layers. Note that no color development/discoloration was seen in the thermally sensitive papers. For the thermally sensitive papers provided with these releasing layers, adhesion evaluations were carried out for the releasing layer at the various conditions, with the results shown in Table 2.

TABLE 2

| <Adhesion Evaluation Results> *100° C. × 30 s | Embodiment 1 | Embodiment 3-1 | Embodiment 3-2 |
|---|---|---|---|
| Initial 23° C., humidity 80% After 3 days | ○ | ○ | ○ |
| 40° C., humidity 90% After 1 day | ○ | ○ | ○ |

TABLE 2-continued

| <Adhesion Evaluation Results> *100° C. × 30 s | Embodiment 1 | Embodiment 3-1 | Embodiment 3-2 |
|---|---|---|---|
| Same, after 3 days | Δ | ○ | ○ |
| Same, after 7 days | × | ○ | ○ |
| Same, after 10 days | × | ○ | ○ |

Summary for Embodiment 1 and Embodiments 3-1 and 3-2

The thermally sensitive paper equipped with the releasing layer produced through Embodiment 1 was provided with adequate adhesion under conditions of 23° C. and humidity of 80%, but under harsher conditions of 40° C. and humidity of 90%, as the number of days elapsed, adhesion failures occurred. However, in Embodiments 3-1 and 3-2, which further included the (B2) component, there was good adhesion even after 10 days elapsed at 40° C. and humidity of 90%, confirming that the use of the (B2) component enabled achievement of superior adhesion.

The invention claimed is:

1. A curable organopolysiloxane releasing agent composition for a thermally sensitive paper, said composition comprising the following components:
   (A) one or more organopolysiloxanes having an alkenyl group with a number of carbon atoms between 4 and 12, where the inclusion proportion of vinyl ($CH_2$=CH—) within the alkenyl group is between 0.5 and 3.0 mass %;
   (B) an organohydrogen polysiloxane mixture of two or more different organohydrogen polysiloxanes each having at least two silicon-bonded hydrogen atoms (Si—H) in a single molecule, wherein the component (B) comprises:
      (B1) an organohydrogen polysiloxane having a viscosity at 25° C. in a range of from 2.5 to 50 mPa·s; and
      (B2) an organohydrogen polysiloxane having a viscosity at 25° C. in a range of from 100 to 500 mPa·s;
      wherein the components (B1) and (B2) are mixed with a mass ratio of from 75:25 to 90:10, and
      wherein the component (B1) has a lower degree of polymerization than the component (B2);
   (C) a hydrosilylation reaction catalyst; and
   (D) a hydrosilylation reaction inhibiting agent;
      wherein the silicon atom-bonded hydrogen atoms within the component (B) is in an amount of from 1.0 to 4.0 moles per one mole of carbon-carbon double bonds in in the component (A), and
      wherein the curable organopolysiloxane releasing agent composition is solvent-free.

2. The curable organopolysiloxane releasing agent composition as set forth in claim 1, wherein the silicon atom-bonded hydrogen atoms within the component (B) is in an amount of from 1.5 and 3.0 moles per one mole of carbon-carbon double bonds in component (A).

3. The curable organopolysiloxane releasing agent composition as set forth in claim 1, wherein:
   the component (A) is an organopolysiloxane that includes a hexenyl group as the alkenyl group with the number of carbon atoms between 4 and 12; and
   the inclusion proportion, in the composition, of organopolysiloxanes having alkenyl groups with a number of carbon atoms less than 4 is no more than 5.0 mass % of the component (A).

4. The curable organopolysiloxane releasing agent composition as set forth in claim 1, further comprising:
   (E) a photopolymerization initiator.

5. The curable organopolysiloxane releasing agent composition as set forth in claim 1, wherein the viscosity of the composition at 25° C. is between 100 and 50,000 mPa·s.

6. A thermally sensitive paper having a releasing layer that is produced through curing the curable organopolysiloxane releasing agent composition as set forth in claim 1.

7. The thermally sensitive paper as set forth in claim 6, wherein the releasing layer is formed on a thermally sensitive coloring layer or on an intermediate layer that is formed on a thermally sensitive coloring layer.

8. A thermally sensitive printing label sheet that includes the thermally sensitive paper as set forth in claim 6.

9. A linerless thermally sensitive printing label sheet having a structure that includes the thermally sensitive paper as set forth in claim 6, wherein an adhesive layer faces the releasing layer on the thermally sensitive paper.

10. A method for manufacturing a thermally sensitive paper, or a label including a thermally sensitive paper, said method comprising:
   coating the curable organopolysiloxane releasing agent composition as set forth in claim 1 onto a substrate that comprises a thermally sensitive coloring layer; and
   curing, at a temperature that substantially does not cause color development or discoloration of the thermally sensitive coloring layer, the curable organopolysiloxane releasing agent composition on the substrate to form a releasing layer.

11. A method for manufacturing a thermally sensitive paper, or a label that includes a thermally sensitive paper, said method comprising:
   coating the curable organopolysiloxane releasing agent composition as set forth in claim 5 onto a substrate that comprises a thermally sensitive coloring layer; and
   curing, through a combination of heating and an energy beam, the curable organopolysiloxane releasing agent composition to form a releasing agent on the substrate.

12. The curable organopolysiloxane releasing agent composition as set forth in claim 1, wherein the inclusion proportion of vinyl ($CH_2$=CH—) within the alkenyl group of the component (A) is between 1 and 2 mass %.

13. The curable organopolysiloxane releasing agent composition as set forth in claim 1, wherein the component (A) has a viscosity at 25° C. between 50 and 1,000 mPa·s.

14. The curable organopolysiloxane releasing agent composition as set forth in claim 13, wherein the component (A) has a viscosity at 25° C. between 100 and 500 mPa·s.

15. The curable organopolysiloxane releasing agent composition as set forth in claim 1, wherein the component (D) is included in an amount of between 0.001 and 5 parts by weight per 100 parts by weight of the component (A).

16. The curable organopolysiloxane releasing agent composition as set forth in claim 3, wherein the component (D) is included in an amount of between 0.001 and 5 parts by weight per 100 parts by weight of the component (A).

17. The curable organopolysiloxane releasing agent composition as set forth in claim 5, wherein the viscosity of the composition at 25° C. is between 100 and 20,000 mPa·s.

18. The curable organopolysiloxane releasing agent composition as set forth in claim 1, wherein the components (B1) and (B2) are mixed with a mass ratio of from 75:25 to 85:15.

* * * * *